United States Patent
Lee et al.

(10) Patent No.: US 10,703,176 B2
(45) Date of Patent: Jul. 7, 2020

(54) DEVICE FOR OPENING AND CLOSING DAMPER USING KNOB OF AIR VENT

(71) Applicants: Hyundai Motor Company, Seoul (KR); Kia Motors Corporation, Seoul (KR); Hyundai Mobis Co., Ltd., Seoul (KR); NIFCO KOREA Inc., Chungcheongnam-Do (KR)

(72) Inventors: Young Ju Lee, Gyeonggi-do (KR); Jang Hyeok Ahn, Gyeonggi-Do (KR); Choong Yeul Kim, Gyeonggi-Do (KR); Young Rok Lee, Gyeonggi-do (KR); Keun Sig Lim, Gyeonggi-do (KR); Dae Ig Jung, Gyeonggi-do (KR); Jae Seob Choi, Gyeonggi-do (KR); Won Sik Kim, Gyeonggi-do (KR); Woo Hyuk Kim, Chungcheongnam-do (KR)

(73) Assignees: Hyundai Motor Company, Seoul (KR); Kia Motors Corporation, Seoul (KR); Hyundai Mobis Co., Ltd., Seoul (KR); NIFCO KOREA Inc., Asan, Chungcheongnam-do (KR)

( * ) Notice: Subject to any disclaimer, the term of this patent is extended or adjusted under 35 U.S.C. 154(b) by 230 days.

(21) Appl. No.: 15/847,137

(22) Filed: Dec. 19, 2017

(65) Prior Publication Data

US 2019/0092137 A1    Mar. 28, 2019

(30) Foreign Application Priority Data

Sep. 25, 2017  (KR) ........................ 10-2017-0123127

(51) Int. Cl.
*B60H 1/34*    (2006.01)

(52) U.S. Cl.
CPC ... *B60H 1/3421* (2013.01); *B60H 2001/3464* (2013.01); *B60H 2001/3471* (2013.01); *B60H 2001/3478* (2013.01)

(58) Field of Classification Search
None
See application file for complete search history.

(56) References Cited

U.S. PATENT DOCUMENTS 2,964,966 A * 12/1960 Miller ................. G05D 23/1912
74/483 R
3,034,531 A * 5/1962 Kennedy ................. F24F 13/10
137/601.04

(Continued)

*Primary Examiner* — Avinash A Savani
*Assistant Examiner* — Martha M Becton
(74) *Attorney, Agent, or Firm* — Mintz Levin Cohn Ferris Glovsky and Popeo, P.C.; Peter F. Corless

(57) ABSTRACT

A device for opening and closing a damper using a knob of an air vent in a vehicle includes: a wing knob coupled to a horizontal wing mounted in an outlet of an air duct such that the wing knob is slidably movable on the horizontal wing; a first rack gear formed on a rear surface of the wing knob; a transfer gear body meshing with the first rack gear and rotatably mounted on upper and lower vertical wing support frames; a cam gear coaxially and rotatably connected to a lower portion of the transfer gear body; a slider mounted to a bottom surface of the air duct such that the slider is movable in a forward or backward direction on the bottom surface of the air duct, wherein the slider moves forward or backward while contacting the cam gear at a time of rotation of the cam gear; second rack gears formed at both side surfaces of the slider; and damper gears meshing with the second rack gears and rotatably mounted on the bottom surface of the air duct. The damper is coaxially connected to the damper gears and disposed in the air duct.

10 Claims, 6 Drawing Sheets

(56) References Cited

U.S. PATENT DOCUMENTS

| | | | | |
|---|---|---|---|---|
| 3,552,295 A * | 1/1971 | Armstrong | ............ | B60H 1/3421 454/315 |
| 4,258,580 A * | 3/1981 | Lowe | ............ | F16H 19/04 74/109 |
| 4,796,518 A * | 1/1989 | Murray | ............ | B60H 1/3421 454/155 |
| 5,338,252 A * | 8/1994 | Bowler | ............ | B60H 1/3421 454/155 |
| 5,482,506 A * | 1/1996 | Tsuda | ............ | B29C 45/0017 454/155 |
| 6,129,627 A * | 10/2000 | Jankowski | ............ | B60H 1/247 454/144 |
| 6,652,371 B2 * | 11/2003 | Kamio | ............ | B60H 1/345 454/155 |
| 6,685,555 B1 * | 2/2004 | Davis, Jr. | ............ | B60H 1/3421 454/155 |
| 6,893,338 B2 * | 5/2005 | Katagiri | ............ | B60H 1/3421 454/155 |
| 7,018,288 B2 * | 3/2006 | Okada | ............ | B60H 1/3421 454/155 |
| 7,229,348 B2 * | 6/2007 | Shibata | ............ | B60H 1/3421 454/155 |
| 8,113,229 B2 * | 2/2012 | Bosma | ............ | B60H 1/3421 137/353 |
| 8,403,734 B2 * | 3/2013 | Bruss | ............ | B60H 1/00857 454/136 |
| 8,616,943 B2 * | 12/2013 | Arndt | ............ | B60H 1/34 454/154 |
| 9,278,607 B2 * | 3/2016 | Zalan | ............ | B60H 1/3421 |
| 9,555,692 B2 * | 1/2017 | Shibata | ............ | B60H 1/3421 |
| 9,579,954 B2 * | 2/2017 | Kim | ............ | B60H 1/3421 |
| 9,724,981 B2 * | 8/2017 | Sakakibara | ............ | B60H 1/3421 |
| 9,956,852 B2 * | 5/2018 | Ahn | ............ | B60H 1/3421 |
| 10,005,341 B2 * | 6/2018 | Voigt | ............ | B60H 1/3421 |
| 10,131,210 B2 * | 11/2018 | Belzons | ............ | B60H 1/3421 |
| 10,160,293 B2 * | 12/2018 | Brinas | ............ | B60H 1/00564 |
| 10,328,773 B2 * | 6/2019 | Kim | ............ | B60H 1/3421 |
| 10,343,494 B2 * | 7/2019 | Ahn | ............ | B60H 1/3421 |
| 2002/0094774 A1 * | 7/2002 | Demerath | ............ | B60H 1/345 454/320 |
| 2002/0178744 A1 * | 12/2002 | Tanabe | ............ | B60H 1/3421 62/407 |
| 2003/0050001 A1 * | 3/2003 | Kamio | ............ | B60H 1/345 454/155 |
| 2003/0157880 A1 * | 8/2003 | Nishida | ............ | B60H 1/3414 454/155 |
| 2004/0038643 A1 * | 2/2004 | Katagiri | ............ | B60H 1/3421 454/314 |
| 2004/0127153 A1 * | 7/2004 | Demerath | ............ | B60H 1/3421 454/155 |
| 2004/0171344 A1 * | 9/2004 | Krause | ............ | B60H 1/3421 454/315 |
| 2004/0203334 A1 * | 10/2004 | Shibata | ............ | B60H 1/3428 454/155 |
| 2005/0048905 A1 * | 3/2005 | Yang | ............ | B60H 1/3421 454/155 |
| 2005/0239391 A1 * | 10/2005 | Shibata | ............ | B60H 1/3421 454/155 |
| 2006/0057952 A1 * | 3/2006 | Kim | ............ | B60H 1/3428 454/155 |
| 2007/0060040 A1 * | 3/2007 | Ogura | ............ | B60H 1/3421 454/319 |
| 2010/0263401 A1 * | 10/2010 | Sakakibara | ............ | B60H 1/3421 62/408 |
| 2011/0319005 A1 * | 12/2011 | Sawada | ............ | B60H 1/00678 454/155 |
| 2012/0225617 A1 * | 9/2012 | Voigt | ............ | B60H 1/3421 454/155 |
| 2013/0078900 A1 * | 3/2013 | Zalan | ............ | B60H 1/3421 454/152 |
| 2013/0149952 A1 * | 6/2013 | Demerath | ............ | B60H 1/3421 454/155 |
| 2013/0225058 A1 * | 8/2013 | Ross | ............ | B60H 1/34 454/155 |
| 2014/0308889 A1 * | 10/2014 | Oe | ............ | F24F 13/15 454/315 |
| 2015/0044959 A1 * | 2/2015 | Chikagawa | ............ | B60H 1/00521 454/152 |
| 2015/0065031 A1 * | 3/2015 | Shibata | ............ | B60H 1/3421 454/322 |
| 2016/0114654 A1 * | 4/2016 | Lee | ............ | B60H 1/3414 454/155 |
| 2017/0176045 A1 * | 6/2017 | Terai | ............ | B60H 1/345 |
| 2017/0305238 A1 * | 10/2017 | Brinas | ............ | B60H 1/00564 |
| 2018/0283729 A1 * | 10/2018 | Terasawa | ............ | F24F 13/1413 |
| 2019/0001790 A1 * | 1/2019 | Demerath | ............ | B60H 1/3421 |

* cited by examiner

[FIG. 1]
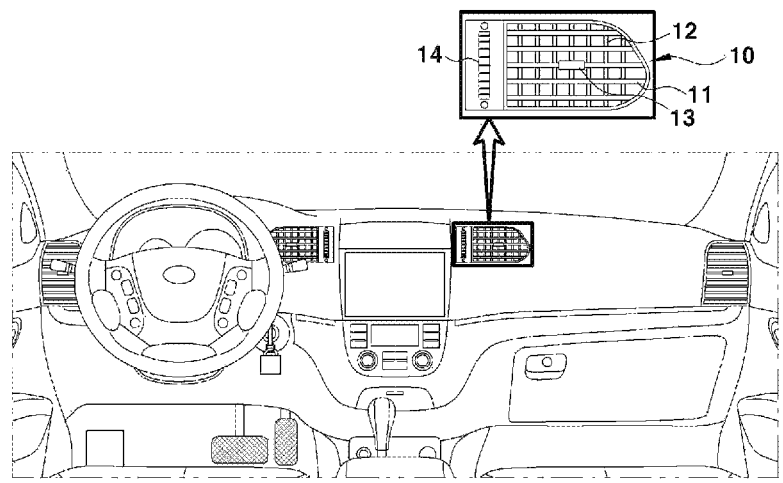
[FIG. 2]
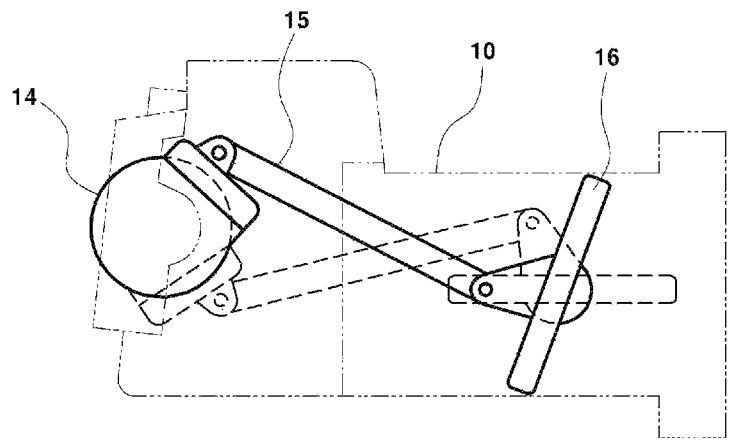

[FIG. 3]
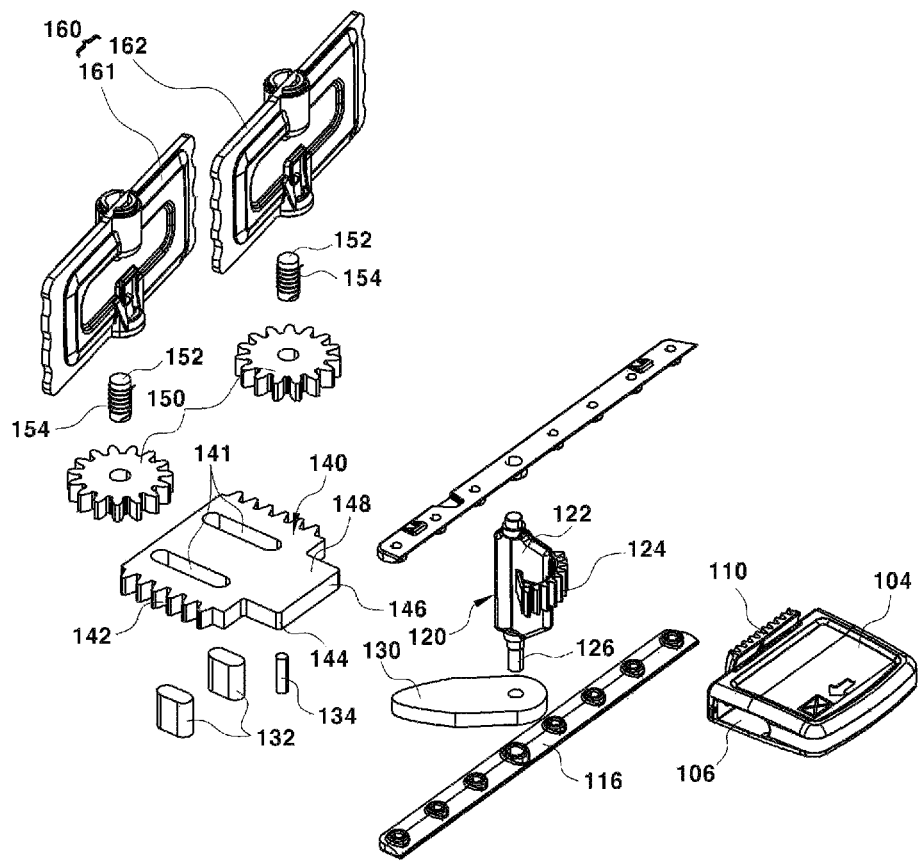
[FIG. 4]
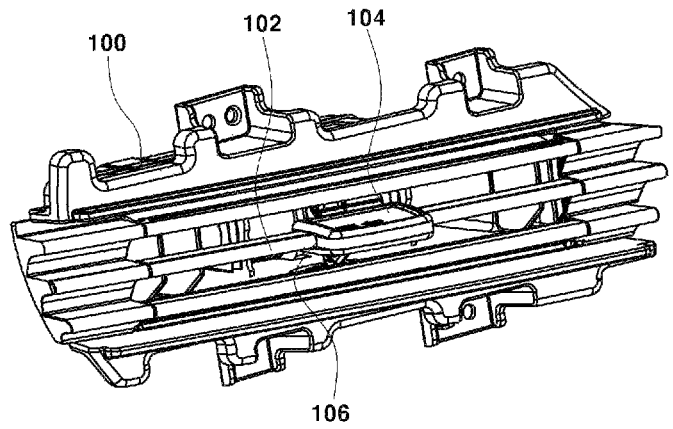

[FIG. 5]
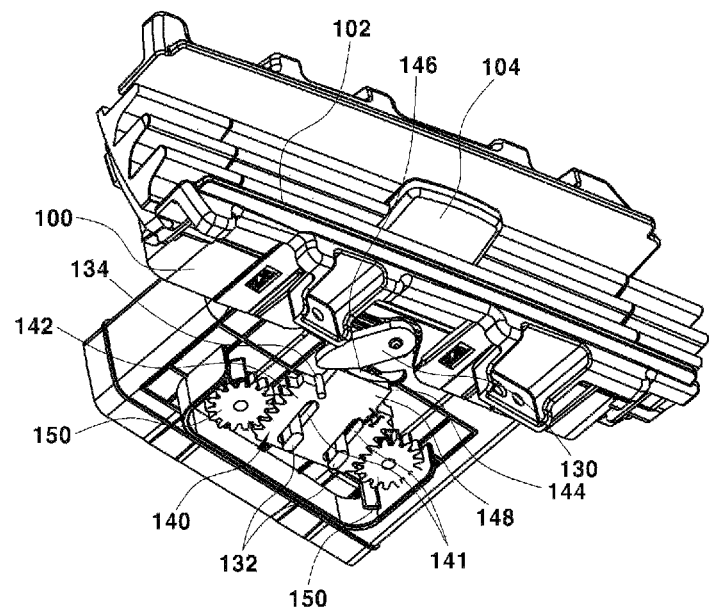
[FIG. 6]
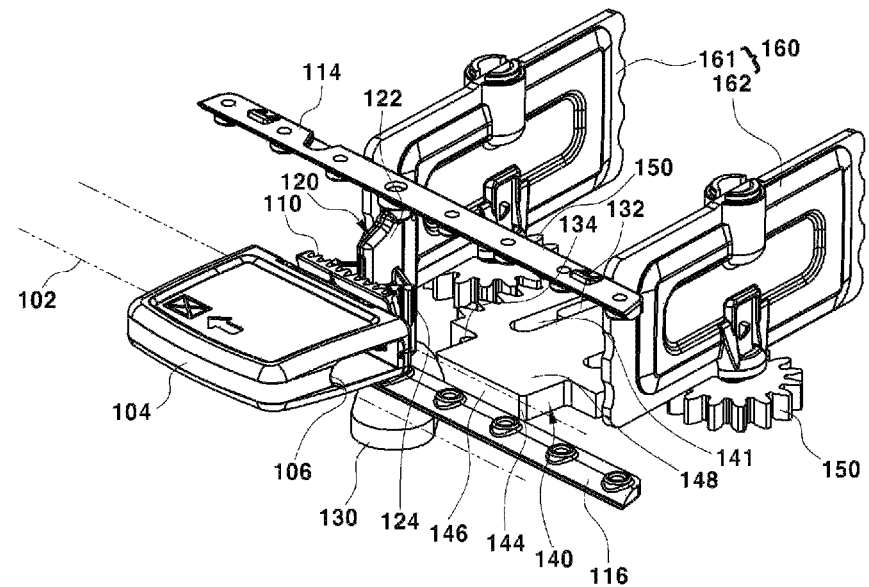

[FIG. 7]
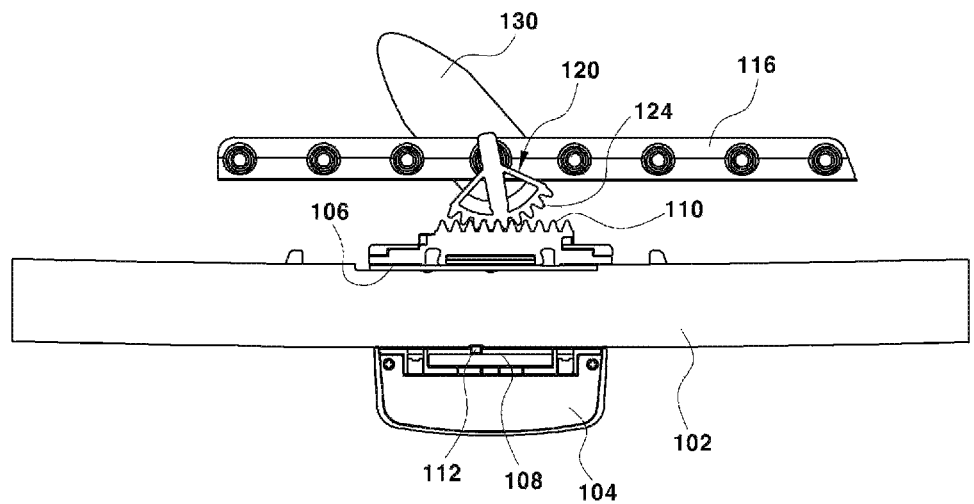

[FIG. 8]
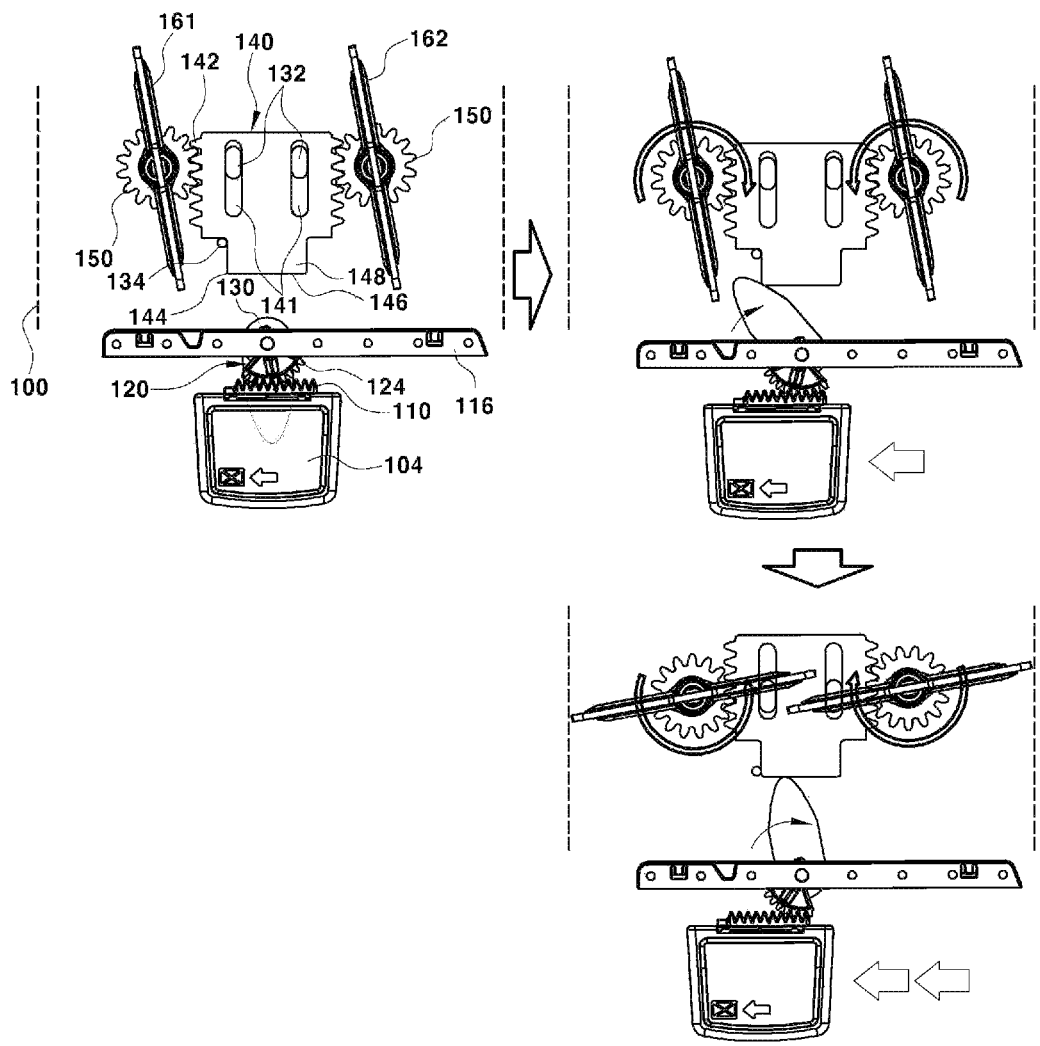

[FIG. 9]
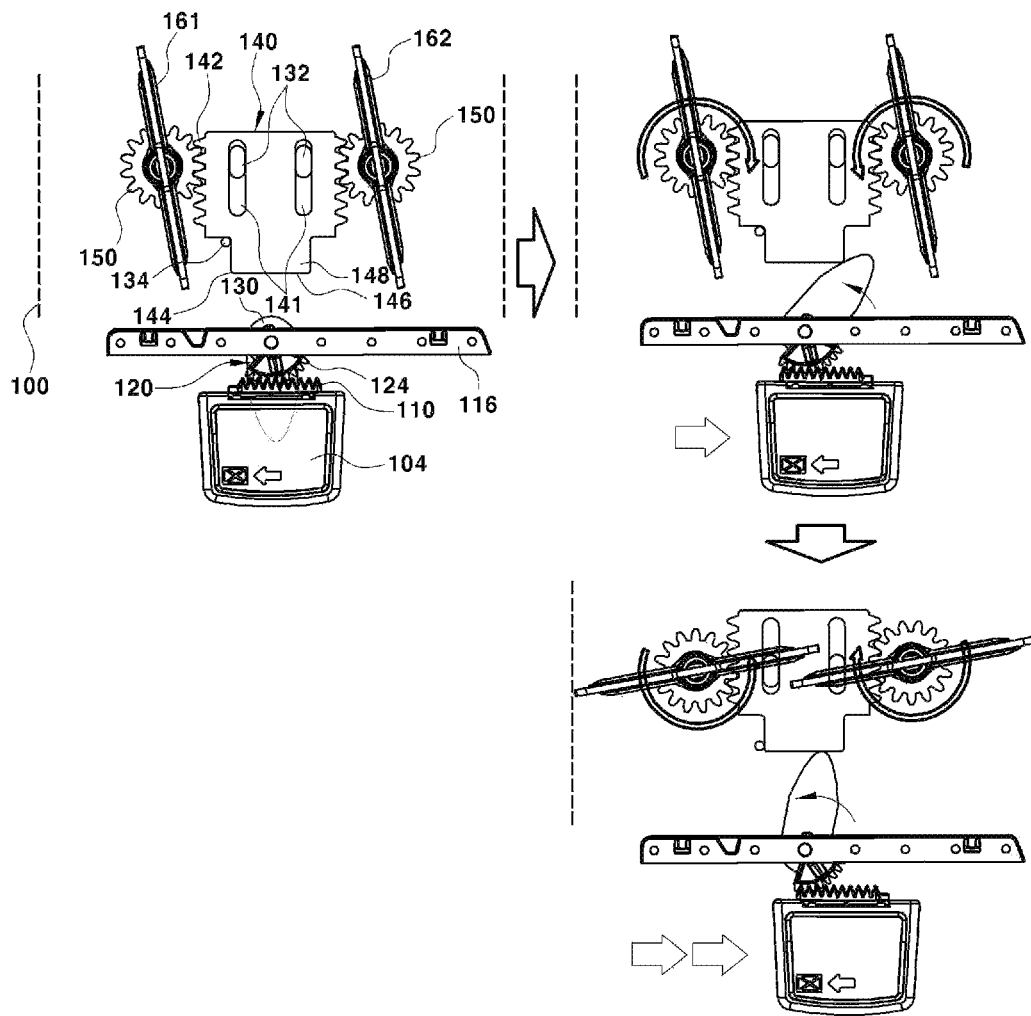

DEVICE FOR OPENING AND CLOSING DAMPER USING KNOB OF AIR VENT

CROSS-REFERENCE TO RELATED APPLICATION

This application claims under 35 U.S.C. § 119(a) the benefit of priority to Korean Patent Application No. 10-2017-0123127 filed on Sep. 25, 2017, the entire contents of which are incorporated by reference as if fully set forth herein.

BACKGROUND

(a) Technical Field

The present disclosure relates to a device for opening and closing a damper using a knob of an air vent. More particularly, it relates to a device for opening and closing a damper using a knob of an air vent for a vehicle capable of facilitating opening and closing of the damper that allows or blocks air flow.

(b) Background Art

Many vehicles have installed therein an air vent apparatus for discharging air into the interior of the vehicle as a means to control cooling or heating. A user is typically able to manipulate the apparatus to adjust an amount and a direction of the discharged air.

In most cases, the air vent apparatus includes a center air vent mounted in a center fascia panel between the front side of a driver's seat and the front side of a passenger's seat, as well as side vents mounted in crash pads of the front sides of the driver's seat and the passenger's seat, and the like.

Referring to FIGS. 1 and 2, a conventional air vent apparatus includes a horizontal wing 11 that may rotate in a vertical direction, a vertical wing 12 that may rotate in a horizontal direction, a wing knob 13 for adjusting angular rotation of the horizontal wing 11 and the vertical wing 12, a damper 16 mounted to be angularly rotatable at a rear end portion in an air duct 10, and a knob 14 for opening and closing of the damper 16. The damper 16 is a door for blocking or allowing air flowing toward the interior of the vehicle through the air duct 10, and is connected to the knob 14 for a damper via a predetermined link mechanism 15. Accordingly, when adjusting the wing knob 13 in the vertical direction, the horizontal wing 11 moves vertically such that the air direction is adjusted in the vertical direction, and when adjusting the wing knob 13 in the horizontal direction, the vertical wing 12 moves horizontally such that the air direction is adjusted in the horizontal direction.

Further, when rotating the knob 14 for a damper in one direction, the link mechanism 15 interworks therewith such that the damper 16 is angularly rotated in an opening direction, thereby allowing air flow into the interior of the vehicle. On the other hand, when rotating the knob 14 in the opposite direction, the link mechanism 15 interworks therewith such that the damper 16 is angularly rotated in a closing direction, thereby blocking air flow toward the interior of the vehicle.

Among the components of the conventional air vent apparatus, the knob for a damper is mounted while occupying a certain area at one side portion of the outlet of the air duct, as illustrated in FIG. 1. However, there are problems in packaging with peripheral components, in addition to design constraints. Specifically, as the knob for a damper occupies some area of a center fascia panel, a crash pad, or the like at one side portion of the outlet of the air duct, space for mounting a cluster, an audio, video, navigation (AVN) apparatus, or the like, around the air vent is reduced.

The above information disclosed in this Background section is only for enhancement of understanding of the background of the disclosure, and therefore it may contain information that does not form the related art.

SUMMARY OF THE DISCLOSURE

The present disclosure has been made in an effort to solve the above-described problems associated with related art.

An object of the present disclosure is to provide a device for opening and closing a damper using a knob of an air vent capable of easily opening and closing a damper using a cam gear interworking with a wing knob and a rack and pinion gear interworking with the cam gear among components of an air vent apparatus, such that an existing knob for a damper may be removed, thereby reducing the number of components and costs, and resolving problems related to packaging with peripheral components and design constraints of other vehicle components.

According to embodiments of the present disclosure, a device for opening and closing a damper using a knob of an air vent includes: a wing knob coupled to a horizontal wing mounted in an outlet of an air duct such that the wing knob is slidably movable on the horizontal wing; a first rack gear formed on a rear surface of the wing knob; a transfer gear body meshing with the first rack gear and rotatably mounted on upper and lower vertical wing support frames; a cam gear coaxially and rotatably connected to a lower portion of the transfer gear body; a slider mounted to a bottom surface of the air duct such that the slider is movable in a forward or backward direction on the bottom surface of the air duct, wherein the slider moves forward or backward while contacting the cam gear at a time of rotation of the cam gear; second rack gears formed at both side surfaces of the slider; and damper gears meshing with the second rack gears and rotatably mounted on the bottom surface of the air duct. The damper is coaxially connected to the damper gears and disposed in the air duct.

The wing knob may have a horizontal wing insertion hole penetrating therethrough in a horizontal direction enabling the wing knob to be slidably movable on the horizontal wing.

A limiting groove limiting a movement distance of the wing knob may be concavely and inwardly formed in the horizontal wing insertion hole, and a limiting pin inserted into the limiting groove to limit the movement distance of the wing knob may be formed on a front surface of the horizontal wing.

The transfer gear body may include: a rotator connected to the upper and lower vertical wing support frames such that the rotator is angularly rotatable, and a fan-shaped gear integrally formed on a front surface of the rotator and meshing with the first rack gear.

A rotation shaft of the transfer gear body may penetrate through the lower vertical wing support frame to be coaxially connected to a central point of rotation of the cam gear.

A slot may be formed in the slider extending longitudinally in a forward and backward direction, and a guide pin inserted into the slot can be mounted on the bottom surface of the air duct.

A cam gear contacting end having a right angle surface and a horizontal surface that contact the cam gear may be integrally formed at a front end portion of the slider.

A stopper guiding linear movement of the slider and limiting a forward movement distance of the slider may be integrally formed on the bottom surface of the air duct.

A torsion spring applying elastic restoring force in an opening direction of the damper may be mounted on a connection shaft connecting the damper gear to the damper.

The damper may be a double damper in which a first damper and a second damper are simultaneously operated based on an internal area of the air duct.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein:

FIGS. 1 and 2 are schematic view illustrating a conventional air vent apparatus and a device for opening and closing a damper;

FIG. 3 is an exploded perspective view illustrating a device for opening and closing a damper using a knob of an air vent according to embodiments of the present disclosure;

FIGS. 4 and 5 are assembled perspective views illustrating the device for opening and closing a damper using a knob of an air vent according to embodiments of the present disclosure;

FIG. 6 is a perspective view illustrating the device for opening and closing a damper using a knob of an air vent according to embodiments of the present disclosure from which some components such as an air duct, a horizontal wing, a vertical wing, and the like are excluded;

FIG. 7 is a cross-sectional view illustrating a coupling structure between a wing knob and a horizontal wing of the device for opening and closing a damper using a knob of an air vent according to embodiments of the present disclosure; and FIGS. 8 and 9 are plan cross-sectional views illustrating an operating state of the device for opening and closing a damper using a knob of an air vent according to embodiments of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with certain embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, embodiments of the present disclosure will be described in detail with reference to the accompanying drawings.

FIGS. 3 and 6 are perspective views illustrating a device for opening and closing a damper using a knob of an air vent according to embodiments of the present disclosure, and reference numeral 100 indicates an air duct.

A plurality of horizontal wings 102 for adjusting a vertical air direction are mounted in an outlet of the air duct 100, that is, the outlet adjacent to an interior of a vehicle, and a wing knob 104 for manipulating the horizontal wings 102 in a vertical direction is mounted on one of the horizontal wings 102. According to the present disclosure, the wing knob 104 is mounted to be slidably movable on one of the horizontal wings 102.

To this end, the wing knob 104 has a horizontal wing insertion hole 106 through which the horizontal wing 102 is inserted penetrating therethrough in the horizontal direction. One of the horizontal wings 102 mounted in the outlet of the air duct 100 is inserted and coupled to the horizontal wing insertion hole 106 of the wing knob 104, such that the wing knob 104 may slidably move in the horizontal direction along the horizontal wing 102.

Referring next to FIG. 7, a limiting groove 108 that is horizontally long is concavely formed at a surface toward the interior in the horizontal wing insertion hole 106 of the wing knob 104, and a limiting pin 112 inserted into the limiting groove 108 integrally protrudes from a front surface of the horizontal wing 102. The limiting groove 108 of the wing knob 104 serves to limit a horizontal sliding movement distance of the wing knob 104, and the limiting pin 112 of the horizontal wing 102 serves as a stopper limiting the horizontal sliding movement distance of the wing knob 104. As such, when holding and moving the wing knob 104 to the left or the right, if the limiting pin 112 is interrupted at one end or the other end of the limiting groove 108, a movement distance of the wing knob 104 moving along the horizontal wing 102 to the left side or the right side is limited.

A reason for limiting the movement distance of the wing knob 104 to the left side and the right side as described above is to match a rotation angle of a cam gear interworking with the movement of the wing knob 104 to the left side or the right side, a distance of forward and backward movement of a slider, and the like to an opening and closing angle of the damper.

Meanwhile, a first rack gear 110 is integrally formed on a rear surface of the wing knob 104. Further, a transfer gear body 120 meshing with the first rack gear 110 is rotatably mounted on upper and lower vertical wing support frames 114 and 116 of the air duct 100. The upper and lower vertical wing support frames 114 and 116 are attached on an inner surface of the air duct 100 so that a plurality of vertical wings (not illustrated) for adjusting a horizontal air direction may be mounted to be angular-rotatable.

The transfer gear body 120 is arranged together with the plurality of vertical wings at the central position, and rotatably mounted on the upper and lower vertical wing support frames 114 and 116 at an upper end portion and a lower end portion of the transfer gear body 120. More specifically, the transfer gear body 120 includes a rotator 122 connected to be angularly rotatable to the upper and lower vertical wing support frames 114 and 116, and a fan-shaped gear 124 integrally formed on the rotator 122 and meshing with the first rack gear 110.

A rotating shaft 126 of the transfer gear body 120, that is, the rotating shaft 126 of the rotator 122 extends to a bottom portion of the air duct 100 while penetrating through the lower vertical wing support frame 116. A cam gear 130 is coaxially connected to the rotating shaft 126 of the transfer gear body 120, that is, the rotating shaft 126 extending to the bottom portion of the air duct 100.

As the rotating shaft 126 of the transfer gear body 120 is coaxially connected to a central point of rotation of the cam gear 130 while penetrating through the lower vertical wing support frame 116, the transfer gear body 120 and the cam gear 130 may simultaneously perform angular rotation.

Meanwhile, a slider 140 linearly moving in a forward movement direction or a backward movement direction while contacting the cam gear 130 at the time of angular rotation of the cam gear 130 is mounted on a bottom surface of the air duct 100. The slider 140 having a rectangular plate shape has a pair of linear type slots 141 that are long in a forward and backward direction penetrating therethrough, and second rack gears 142 formed at both side surfaces thereof.

Further, a cam gear contacting end 148 having a right angle surface 144 and a horizontal surface 146 that contact the cam gear 130 is integrally formed at a front end portion of the slider 140. Thus, when the cam gear 130 rotates in a backward direction (i.e., the direction opposite to the interior direction), the cam gear 130 contacts along the right angle surface 144 and the horizontal surface 146 to push the cam gear contacting end 148 backward, such that the slider 140 is moved in the backward movement direction.

On the other hand, when the cam gear 130 rotates in a forward direction (i.e., the interior direction), the cam gear 130 contacts along the horizontal surface 146 and the right angle surface 144 and then returns to an original position where it does not contact the cam gear contacting end 148, and at the same time, the slider 140 is moved in the forward movement direction by elastic restoring force of a torsion spring 154 as described below.

Guide pins 132 inserted into the slots 141 of the slider 140 are integrally formed on the bottom surface of the air duct 100 or on a cover body (not illustrated) covering the bottom surface of the air duct 100, and serve to guide linear forward and backward movement directions of the slider 140 in a state of being inserted into the slots 141. A stopper 134 for guiding linear movement of the slider 140 and limiting a maximum forward movement distance of the slider can be further integrally formed on the bottom surface of the air duct 100 or on the cover body (not illustrated) covering the bottom surface of the air duct 100. As the stopper 134 closely adheres to right angle groove portions formed at both side portions of the cam gear contacting end 148 of the slider 140 at the time of maximum forward movement of the slider 140, the maximum forward movement distance of the slider 140 is limited.

Meanwhile, damper gears 150 rotatably mounted on the bottom surface of the air duct mesh with the second rack gears 142 are formed at both side surfaces of the slider 140. Further, the damper gear 150 is coaxially connected to the damper 160 disposed within the air duct 100. The damper gear 150 having a spur gear form serves to transfer rotational force in a closing direction to the damper 160 at the time of backward movement of the slider 140, and transfer rotational force in an opening direction to the damper at the time of forward movement of the slider 140.

The torsion spring 154 applying elastic restoring force in the opening direction of the damper 160 can be mounted on a connection shaft 152 connecting the damper gear 150 and the damper 160. Therefore, when the cam gear 130 is released from the cam gear contacting end 148 of the slider 140, the slider 140 is moved in the forward movement direction by the elastic restoring force of the torsion spring 154 and the second rack gear 142 of the slider 140 rotates the damper gear 150 in the opening direction of the damper 160, and at the same time, the damper 160 performs angular rotation in the opening direction to be in an opened state that allows air flow.

Meanwhile, the air duct 100 of the present disclosure is a slim type air duct having a low height and a long horizontal length. Thus, the damper 160 may be a double damper that is divided into a first damper 161 and a second damper 162 is used, rather than one integral damper.

If one integral damper is used as the damper 160, since a rotation trajectory of the integral damper is large due to an internal area of the air duct 100 having a low height and a long horizontal length, a size of the air duct needs to be increased accordingly. On the other hand, if the double damper including the first damper 161 and the second damper 162 is used as the damper 160 of the present disclosure, an angular rotation trajectory of each of the dampers 161 and 162 may be easily secured even with the limited internal area of the air duct 100 having a low height and a long horizontal length, and air flow may be easily blocked or allowed.

An operation flow of the device for opening and closing a damper using a knob according to the present disclosure including the above-described components will be described as below.

FIG. 8 illustrates an operating state of the device for opening and closing a damper using a knob when moving the wing knob of the present disclosure in the left direction, and FIG. 9 illustrates an operating state of the device for opening and closing a damper using a knob when moving the wing knob of the present disclosure in the right direction. As illustrated in FIGS. 8 and 9, a closing operation of the damper 160 is equally performed when moving the wing knob 104 to the left and the right from a neutral position. Therefore, only an operation of opening and closing the damper when moving the wing knob 104 in the left direction and returning the wing knob 104 to the neutral position again will be described.

When the wing knob 104 is in the neutral position (i.e., boundary position at which a left movement distance and a right movement distance are the same as each other), if an operator moves the wing knob 104 to the left or the right by a predetermined distance, although not illustrated, a horizontal air direction angle of the vertical wing is adjusted by a known link mechanism.

When an air direction angle of the vertical wing is adjusted to the left by moving the wing knob 104 to the left by a predetermined distance, if further moving the wing knob 104 to the left, the first rack gear 110 formed on the wing knob 104 transfers rotational force in a clockwise direction to the fan-shaped gear 124 of the transfer gear body 120. Subsequently, the transfer gear body 120 angularly rotates in the clockwise direction, and at the same time, the cam gear 130 coaxially connected to the transfer gear body 120 via the rotation shaft 126 also rotates in the clockwise direction.

Next, as illustrated in the drawing at the center in FIG. 8, the cam gear 130 pushes the entire slider 140 backward while contacting the right angle surface 144 of the cam gear contacting end 148 of the slider 140. Next, as illustrated in the drawing at the left in FIG. 8, the cam gear 130 maximally pushes the entire slider 140 backward while contacting the horizontal surface 146 of the cam gear contacting end 148 of the slider 140. Accordingly, the slider 140 moves backward while being guided by the guide pin 142 inserted into the slot 141, and at the same time, the second rack gear 142 of the slider 140 transfers rotational force in the closing direction of the damper 160 to the damper gear 150.

Therefore, the damper 160 to which the damper gear 150 is coaxially connected via the connection shaft 152, that is, the first and second dampers 161 and 162, angularly rotate in the closing direction to block an air flow passage of the air duct 100, thereby easily blocking air discharged to the interior through the air duct. Meanwhile, the torsion spring 154 is mounted on the connection shaft 152 coaxially connecting the damper gear 150 to the damper 160, and the elastic restoring force of the torsion spring 154 is always applied in the opening direction of the damper 160.

Since the cam gear 130 is in a state in which the cam gear 130 contacts the horizontal surface 146 of the slider 140, the damper 160 maintains the closed state even though the elastic restoring force of the torsion spring 154 is applied. On the other hand, if moving the wing knob 104 to the neutral position again, the first rack gear 110 formed on the wing knob 104 transfers rotational force in a counterclockwise direction to the fan-shaped gear 124 of the transfer gear body 120, and at the same time, the cam gear 130 also rotates in the counterclockwise direction. As a result, the cam gear 130 is released from the cam gear contacting end 148 of the slider 140.

Accordingly, the damper gear 150 and the damper 160 rotate in the opening direction by the elastic restoring force of the torsion spring 154, and at the same time, the slider 140 moves forward. As the stopper 134 closely adheres to right angle groove portions formed at both side portions of the cam gear contacting end 148 of the slider 140 at the time of maximum forward movement of the slider 140, the maximum forward movement distance of the slider 140 is limited. Therefore, only by manipulation of moving the wing knob 104 to the neutral position again, the damper 160, that is, the first and second dampers 161 and 162, angularly rotate in the opening direction to allow flow of air discharged to the interior through the air duct 100.

As described above, the damper may be easily opened and closed by using the cam gear that angularly rotates when linearly moving the wing knob in one direction, and the slider and the rack and pinion gear interworking with the cam gear, thereby easily blocking and allowing air flow. Further, by removing the existing knob for a damper, the number of components and costs may be reduced and it is possible to improve a degree of freedom of design for a cluster, an AVN apparatus, and the like disposed around the air vent.

The present disclosure provides, at least, the following effects.

First, the damper may be easily opened and closed by using the cam gear that angularly rotates when linearly moving the wing knob coupled to one of the horizontal wings in one direction, and the rack and pinion gear interworking with the cam gear, such that any need for existing conventional knob for a damper is removed, thereby reducing the number of components and costs.

Second, as the knob for a damper occupying a certain area at the one side portion of the air vent is removed, it is possible to improve a degree of freedom of design for other objects in the center console, such as a cluster, an AVN apparatus, and the like disposed around the air vent.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A device for opening and closing a damper using a knob of an air vent in a vehicle, the device comprising:
   a wing knob coupled to a horizontal wing mounted in an outlet of an air duct such that the wing knob is slidably movable on the horizontal wing;
   a first rack gear formed on a rear surface of the wing knob;
   a transfer gear body meshing with the first rack gear and rotatably mounted on upper and lower vertical wing support frames;
   a cam gear coaxially and rotatably connected to a lower portion of the transfer gear body, the cam gear configured to angularly rotate while a user linearly moves the wing knob coupled to the horizontal wing in one direction or the other;
   a slider mounted to a bottom surface of the air duct such that the slider is movable in a forward or backward direction on the bottom surface of the air duct, wherein the slider moves forward or backward while contacting the cam gear at a time of rotation of the cam gear;
   second rack gears formed at both side surfaces of the slider; and
   damper gears meshing with the second rack gears and rotatably mounted on the bottom surface of the air duct,
   wherein the damper is coaxially connected to the damper gears and disposed in the air duct, and wherein a rotation shaft of the transfer gear body penetrates through the upper and lower vertical wing support frames so as to be coaxially connected to a central point of rotation of the cam gear; and
   wherein the damper may be opened or closed by moving the wing knob linearly along the horizontal wing in one direction or the other.

2. The device of claim 1 wherein the wing knob has a horizontal wing insertion hole penetrating therethrough in a horizontal direction enabling the wing knob to be slidably movable on the horizontal wing.

3. The device of claim 2 wherein a limiting groove limiting a movement distance of the wing knob is concavely and inwardly formed in the horizontal wing insertion hole, and a limiting pin inserted into the limiting groove to limit the movement distance of the wing knob is formed on a front surface of the horizontal wing.

4. The device of claim 1, wherein the transfer gear body includes: a rotator connected to the upper and lower vertical wing support frames such that the rotator is angularly rotatable, and a fan-shaped gear integrally formed on a front surface of the rotator and meshing with the first rack gear.

5. The device of claim 1, wherein a rotation shaft of the transfer gear body penetrates through the lower vertical wing support frame to be coaxially connected to a central point of rotation of the cam gear.

6. The device of claim 1, wherein a slot is formed in the slider extending longitudinally in a forward and backward direction, and a guide pin inserted into the slot is mounted on the bottom surface of the air duct.

7. The device of claim 1, wherein a cam gear contacting end having a right angle surface and a horizontal surface that contact the cam gear is integrally formed at a front end portion of the slider.

8. The device of claim 1, wherein a stopper guiding linear movement of the slider and limiting a forward movement distance of the slider is integrally formed on the bottom surface of the air duct.

9. The device of claim 1, wherein a torsion spring applying elastic restoring force in an opening direction of the damper is mounted on a connection shaft connecting the damper gear to the damper.

10. The device of claim 1, wherein the damper is a double damper in which a first damper and a second damper are simultaneously operated based on an internal area of the air duct.

* * * * *